Oct. 27, 1953
P. DAVID
2,657,079
PIPE JOINT
Filed March 29, 1950
2 Sheets-Sheet 1
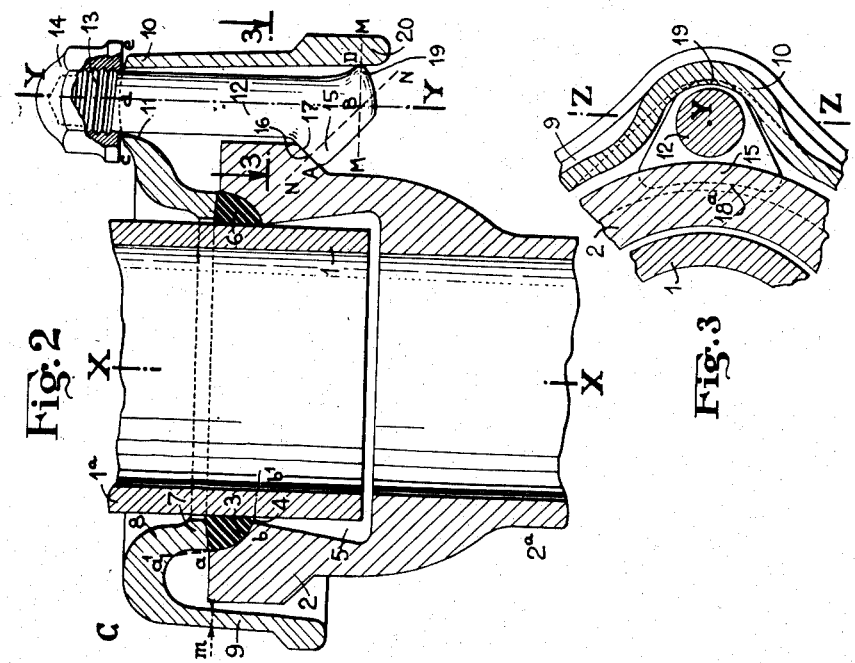
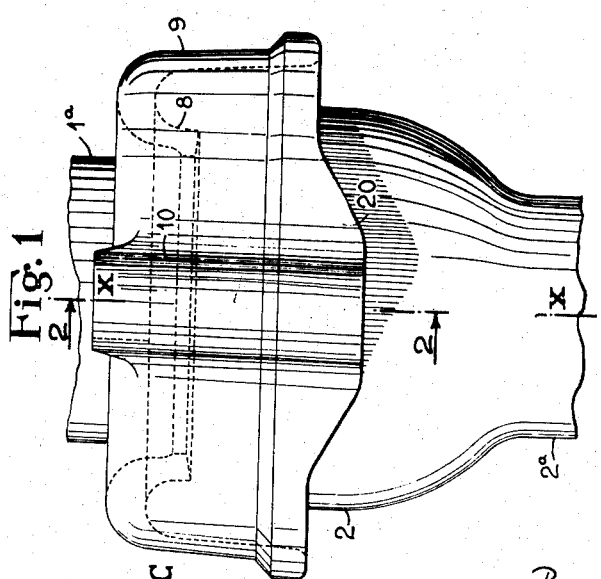
Inventor:
PIERRE DAVID
by Delatte-Seguy
Attorney

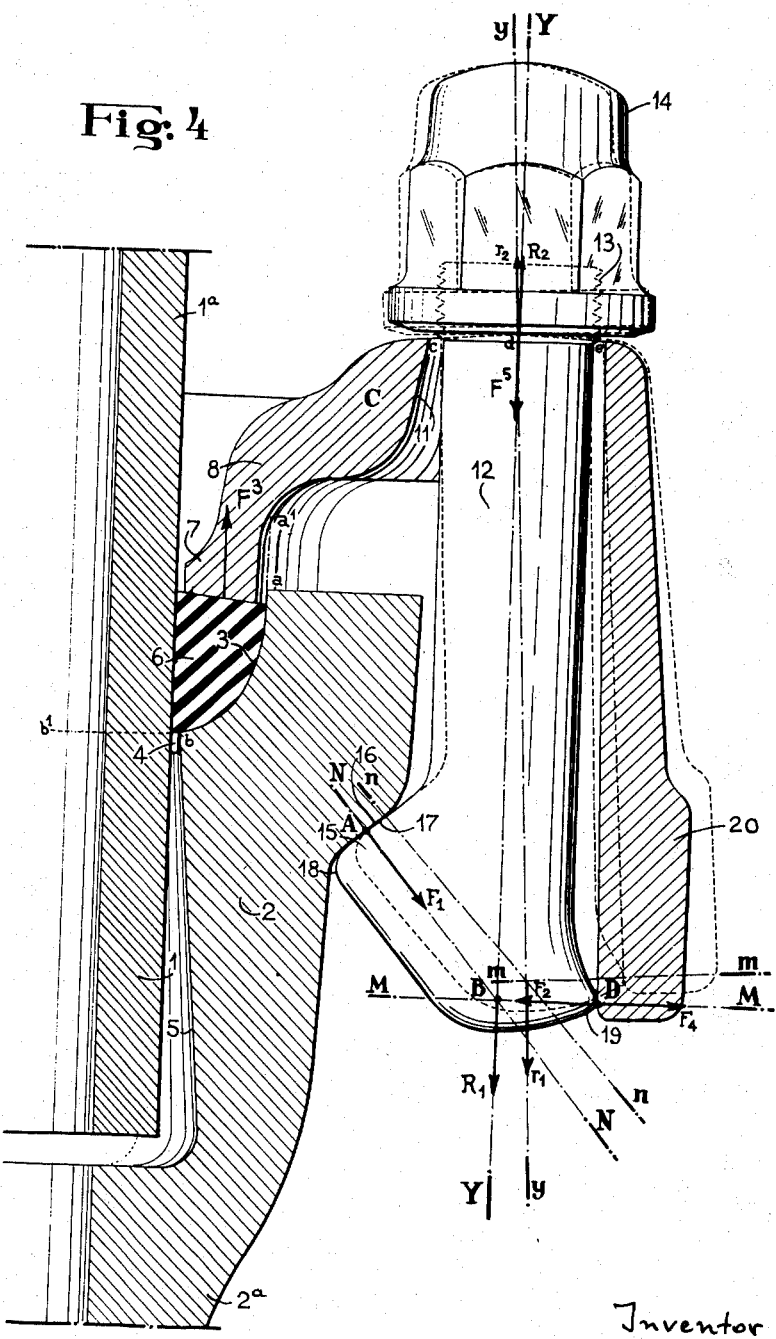

Patented Oct. 27, 1953

2,657,079

UNITED STATES PATENT OFFICE 2,657,079

PIPE JOINT

Pierre David, Pont-a-Mousson, France, assignor to Compagnie de Pont-a-Mousson, Nancy, France, a French body corporate Application March 29, 1950, Serial No. 152,691
In France March 30, 1949

4 Claims. (Cl. 285—164)

The present invention relates to pipe joints for piping elements one comprising a bell and the other a plain spigot.

The invention has for its object to provide a joint of the kind which comprises a resilient ring compressed by a counter-flange tightened by means of bolts which are arranged parallel with the longitudinal axis of said joints and are provided with a side hooking nose for hooking on an outer continuous surface of the bell, said joint being improved in such a manner that each bolt is subjected only to axial traction stresses with the exclusion of any bending stress.

The invention has more particularly for its object a joint in which the head of each bolt comprises, on the one hand, a hooking nose with a sloping hooking surface conjugated with an outer sloping resting surface provided on said bell and, on the other hand, a reaction heel resting against the internal surface of an extension of the said surrounding skirt of the counter-flange, the positions of the centres of both resting surfaces of the bolt head against the counter-flange and against the extension of the skirt and the slopes with respect to the longitudinal axis of the bolt of the said external resting surface provided on the bell and of the conjugated surface of the nose being such that both perpendiculars raised at said centres to both resting surfaces intersect each other on the said longitudinal axis of the bolt.

In the accompanying drawings given only by way of examples:

Fig. 1 is an elevational view showing a joint in accordance with the invention;

Fig. 2 is a longitudinal section on line 2—2 of Fig. 1;

Fig. 3 is a partial cross-section on line 3—3 of Fig. 2;

Fig. 4 is a diagram on a large scale showing the various forces which arise when a bolt is tightened, and the resulting deformations of the skirt and displacement of the bolt.

According to the embodiment which is shown, the plain cylindrical spigot $f$ of pipe $1^a$ enters the bell 2 of the adjacent pipe $2^a$. This bell 2 comprises a recess 3, the longitudinal and radial section surface $ab$ of which has a bend which increases from $a$ towards $b$.

At point $a$ the tangent $aa^1$ slopes very slightly towards the outside with respect to axis XX of the pipe, then the bend increases regularly and in the neighborhood of point $b$ the tangent $bb^1$ is substantially perpendicular to the axis of the pipe.

The recess 3 is extended through a small cylindrical surface 4 and then through a part 5 flaring towards the bottom of the bell so as to enable slight angular deviations of the spigot $f$ in the bell 2.

Located in the recess 3 is a ring 6 of rubber or any other resilient material. This ring is cylindrical on the inside while its external profile corresponds to that of the recess 3.

Because of the usual margins for the diameters of pipe $1^a$ and recess 3, the radial width of the inlet of said recess varies between a minimum and a maximum and, preferably the radial width of said ring 6 is: on the one hand, larger than said minimum in which case said ring must be forcibly inserted which is possible owing to the slight slope of tangent $aa^1$, and on the other hand smaller than said maximum in which case said ring entirely enters said recess where it is to be compressed; the bottom of the recess, owing to the direction of its tangent $bb^1$, forms a stopping surface which hinders the passage of the disc 6 between the spigot $f$ and the cylindrical surface 4.

In both cases said ring is compressed by means of the circular heel 7 of an annular counter-flange C, the section of which is in the shape of an inverted U with unequal legs. Said counter-flange is formed of an inner part 8 serving as a rammer and surrounding the spigot $f$ of the pipe $1^a$ with a small play and of an outer surrounding skirt 9. This skirt 9 has a thickness $m$ which decreases, for example by one half, from the region of junction with rammer 8 to the free edge.

Several bosses 10 are provided on said counter-flange and are regularly distributed on the periphery thereof. Each of said bosses is provided with a hole 11 for the passage of a bolt 12. Said bolt is provided with a thread 13 which is preferably a protruding thread in order not to weaken the section of the bolt.

A nut 14, preferably a recessed nut, screwed onto the thread 13 rests through its lower face against the boss 10 of the counter-flange C.

The head of each bolt 12 comprises a hooking nose 15, the surface 16 of which rests against a conjugated outer surface 17 provided on the flange of the bell 2. The conjugated surfaces 16 and 17 slope, preferably by about 45°, so that the perpendicular NN to said surfaces at the centre A thereof intersects the longitudinal axis YY of the bolt at B in the vicinity of the extremity of the head. When seen in plan (Fig. 3), i. e. in the direction of axis YY, the hooking nose 15 has a trapezoidal shape widening towards the edge 18 of the nose, whereas the profile (Figs. 2, 4) of said nose has a substantially triangular shape; the edge 18 of said nose is more or less rounded; the outline 18a (Fig. 3) of said nose is curvilineal in order to fit the circular shape of bell 2 and thus prevent any rotation of the bolt around its axis YY.

Furthermore, the bolt head comprises, in the neighborhood of its end, a reaction heel 19 which is slightly convex and is adapted to rest against the internal face of an extension 20 of the reinforced edge of the skirt 9 of the counter-flange. The heel 19 is so disposed with respect to the hooking nose that the perpendicular M—M to said extension 20 at the centre D of contact between the heel 19 and said extension intersects the axis YY at the same point B as the perpendicular NN raised at the centre A of the hooking surface of the nose 15.

Finally, the boss surface against which the nut 14 rests comprises two surfaces ed and dc which may be plane or convex and form with each other a very obtuse dihedral of about 170°. The edge d which is slightly rounded, intersects the bolt 12 substantially on the longitudinal axis YY thereof, is located in a plane ZZ (Fig. 3) and is parallel with the tangent to the middle of the edge 18a of the hooking nose 15. Surfaces ed and dc also slope with respect to plane ZZ.

The setting in position of the joint is effected as follows:

The counter-flange C and the ring 6 are engaged onto the spigot 1 and then said spigot is introduced into the bell 2 of the pipe 2a and the ring 6 is forced into the recess 3 of the bell.

The heel 7 of the counter-flange C is then brought to engage the ring 6 and the bolts 12 are introduced from below into the holes 11 of the bosses 10 in the counter-flange. Nuts 14 are then screwed onto the threads 13 of said bolts 12.

During screwing the base of each nut 14 rests against the rounded edge d of the boss.

The hooking surface 16 of the bolt head rests against the surface 17 of the bell which causes the clamping of the disc 6 in its recess 3 through the medium of part 8 forming a rammer.

The reaction $F_1$ (Fig. 4) of the surface 17 on the surface 16 and the reaction $F_2$ of the boss 21 of the bolt are very substantially directed along the perpendiculars NN and MM and thus intersect each other at point B on the axis of the bolt so that the resultant $R_1$ passes through said point B. As this resultant is balanced through the reaction $R_2$ of the edge d on the nut and as this reaction is necessarily an axial one, the resultant $R_1$ which is opposed to the same and which passes through point B is therefore located along the axis YY of the bolt.

Owing to this feature of the invention, the bolt 12 remains subjected only to simple traction stresses which are equally distributed on the whole cross-section of the bolt shank. The resistance of said shank is entirely utilized.

During the tightening, the counter-flange C rests against the ring 6 which causes a reaction $F_3$ which is substantially parallel with axis XX (Figs. 2 and 4). Furthermore, said counter-flange is subjected at D to a stress $F_4$ exerted by the heel 19 of the bolt, said stress being equal and opposed to force $F_2$ and at d to a stress $F_5$ exerted by the nut 14 and equal and opposed to the force $R_2$.

Under the action of said three forces $F_3$, $F_4$ and $F_5$, the counter-flange is deformed and tends to open. It may be pointed out that owing to the fact that the thickness m increases (Fig. 2) from the free end of the skirt 9 of counter-flange C to the region of junction with the inner part 8, the resistance of the counter-flange to deformations is substantially increased. However, said counter-flange slightly opens and takes the shape indicated in dotted lines in Fig. 4, where the deformation has been exaggerated for the sake of clarity of the drawing.

Owing to this deformation, the hooking nose 16 of the bolt slides on its resting surface 17 and the whole bolt unit tilts with respect to its primitive position and takes the position shown in dotted lines. The contact surface of he nut 14 with the boss 10 of the counter-flange then turns around edge d in order to come nearer to the face cd, without the reaction $R_2$ which came to $r_2$ ceasing to be directed along the axis of the bolt. Perpendiculars NN and MM come to nn and mm and further intersect each other on the axis of the bolt which came to yy so that the resultant which came to $r_1$ remains located along the axis of the bolt.

For a given tightening, the invention makes it possible to use for the making of the bolts materials having less mechanical strength but higher resistance to corrosion. Thus the bolts as well as the counter-flange and the pipes may advantageously be made of cast iron. This construction, together with the very enveloping shape of the counter-flange and the blind nut which is used make it possible to obtain flexible joints for underground pipings having the same long life as the pipes themselves; thus are avoided the inconveniences found with previously known joints using steel bolts which were put out of service prematurely because of the corrosion due to the ground.

It is to be noted that owing to the slope of the outer resting surface 17 of the bell 2, said bell has a shape which is similar to that of the usual bells for cast joints, for example lead cast joints, and makes possible a common manufacture, through centrifugation and in the same shell, of pipes for flexible joints according to the invention and pipes for cast joints.

Of course, the invention is not limited to the form of embodiment described and shown which is given only by way of example.

Having now described my invention what I claim as new and desire to secure by Letters Patent is:

1. A flexible pipe joint comprising a spigot and a bell for receiving said spigot, said bell being adapted to deviate angularly relatively to the axis of said spigot; an annular recess on the internal wall of said bell near the mouth end of said bell and having a substantially ovid shape; an external hooking flange on an intermediate portion of said bell, said flange sloping outwards toward the plane of the mouth of said bell and forming an obtuse angle with the portion of said bell adjacent said intermediate portion; a counter-flange consisting of an annular body slidably mounted on said spigot, a resilient outer skirt concentric with said body, and an intermediate part connecting said annular body with said skirt; a resilient washer in said recess between said spigot and said annular body; longitudinal tightening bolts passing through said intermediate part and between said bell and said skirt, the head of each bolt on the bell side having a hooking nose provided with a sloping surface conjugated with said hooking flange and adapted to slide over the latter; each said head further having a reaction heel diametrically opposed to said sloping surface and resting against the internal surface of said skirt; nuts screwed on said bolts and resting against the external surface of said intermediate part for tightening said annular body against said washer, the resting surface for said nuts on said intermediate part being a dihedral surface having an obtuse angle and a rounded edge located in the plane that passes through the axis of the bolt and on respective sides of which the hooking nose and the heel of said bolt are located; the slopes of said hooking flange and of said sloping surface relative to the longitudinal axis of the bolt, and the positions of the resting centers of said sloping surface on said hooking flange and of said heel on said skirt being such that the perpendiculars raised at said centers to the corresponding surface of said hooking flange and said skirt intersect each other on the longitudinal axis of said bolt near the end of its head.

2. A pipe joint as claimed in claim 1, in which said skirt is provided on its periphery with equidistant extensions, each of said extensions being opposite to one of said bolts and having a greater thickness than the skirt, and in which said heel rests against the internal surface of the corresponding extension.

3. A pipe joint as claimed in claim 1, in which the thickness of said skirt is less than the thickness of said intermediate part of said counterflange near its plane of connection with said annular body.

4. A pipe joint as claimed in claim 1, in which the bell fits loosely around said spigot, and in which the internal wall of said bell flares outward between said recess and the bottom of said bell, whereby said spigot is allowed slight angular deviations in said bell.

PIERRE DAVID.

References Cited in the file of this patent

UNITED STATES PATENTS

| Number | Name | Date |
|---|---|---|
| 366,394 | Hardenberg | July 12, 1887 |
| 2,037,184 | Teetor | Apr. 14, 1936 |

FOREIGN PATENTS

| Number | Country | Date |
|---|---|---|
| 790,020 | France | Sept. 2, 1935 |
| 848,252 | France | July 17, 1939 |